July 10, 1934.  E. A. FORD  1,965,975
GANG PUNCH
Filed April 15, 1933  9 Sheets-Sheet 1

INVENTOR
Eugene A. Ford
BY his ATTORNEY
W. M. Wilson

July 10, 1934.  E. A. FORD  1,965,975
GANG PUNCH
Filed April 15, 1933   9 Sheets-Sheet 2
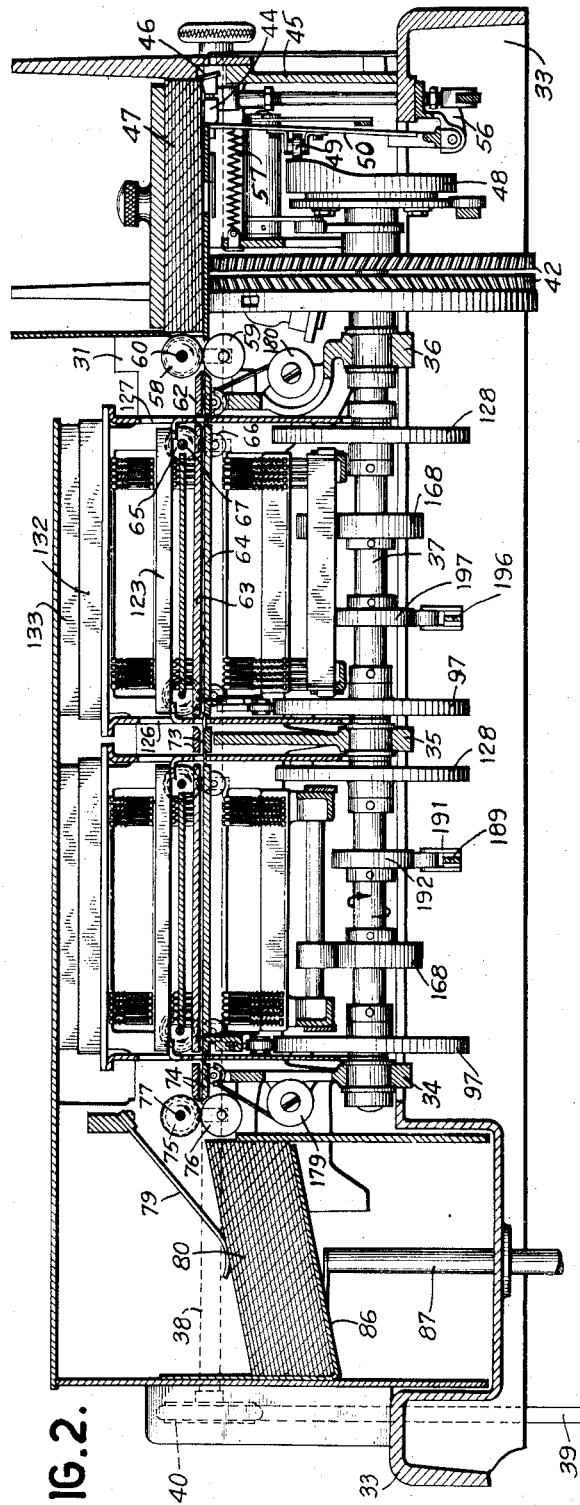

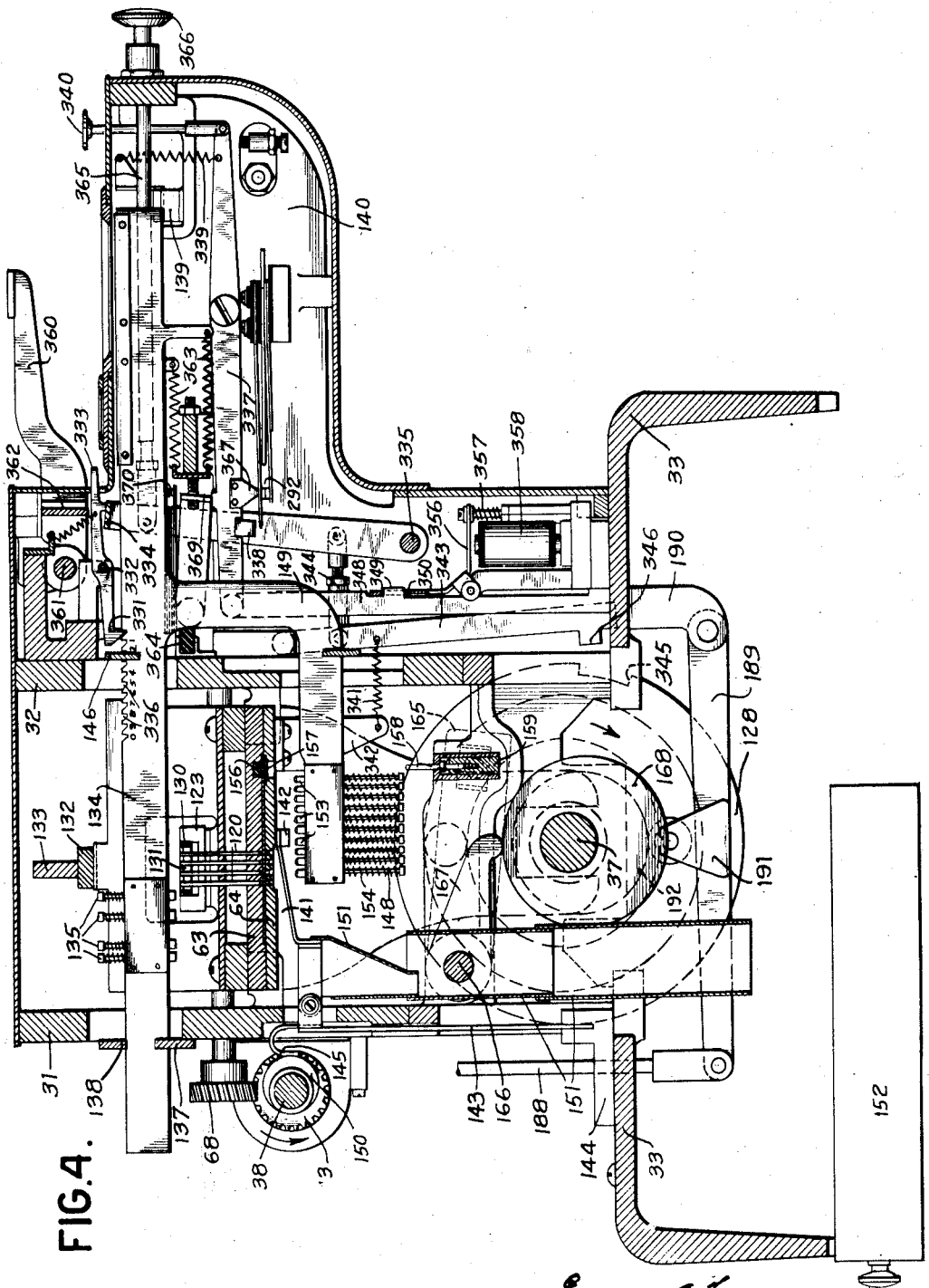

July 10, 1934.　　　　　E. A. FORD　　　　　1,965,975
GANG PUNCH
Filed April 15, 1933　　　9 Sheets-Sheet 4

INVENTOR
Eugene A. Ford
BY
W. M. Wilson
ATTORNEY

July 10, 1934.  E. A. FORD  1,965,975
GANG PUNCH
Filed April 15, 1933  9 Sheets-Sheet 5

INVENTOR
Eugene A. Ford
BY his ATTORNEY
W. M. Wilson

July 10, 1934.　　　　E. A. FOR*　　　　1,965,975
GANG PUNCH
Filed April 15, 1933　　　9 Sheets-Sheet 6

INVENTOR-
Eugene A. Ford
BY
W. M. Wilson
ATTORNEY-

July 10, 1934.     E. A. FORD     1,965,975
GANG PUNCH
Filed April 15, 1933     9 Sheets-Sheet 7

INVENTOR
Eugene A. Ford
BY his ATTORNEY
W. M. Wilson

July 10, 1934.　　　　　E. A. FORD　　　　　1,965,975
GANG PUNCH
Filed April 15, 1933　　　9 Sheets-Sheet 8
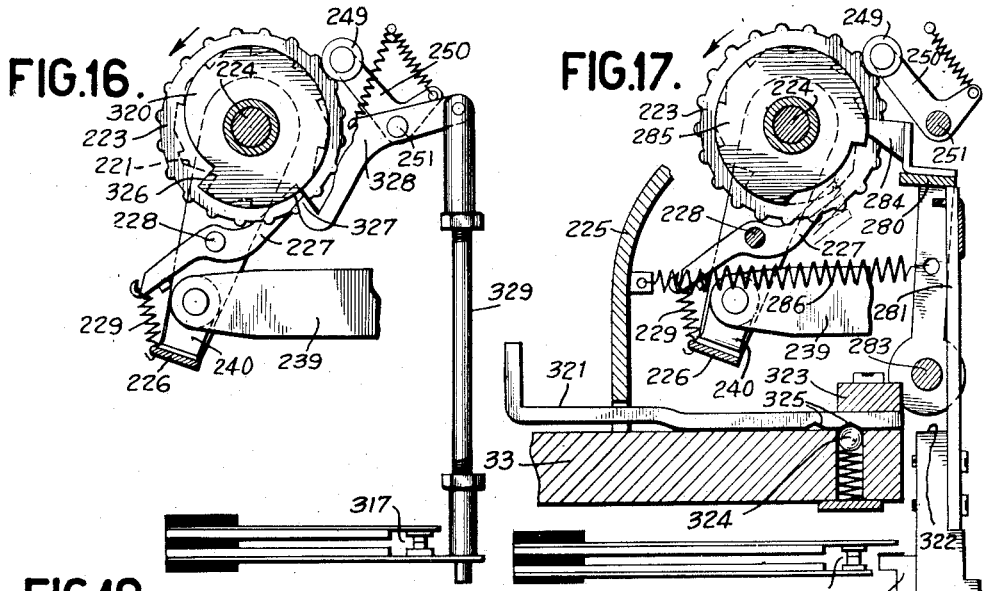
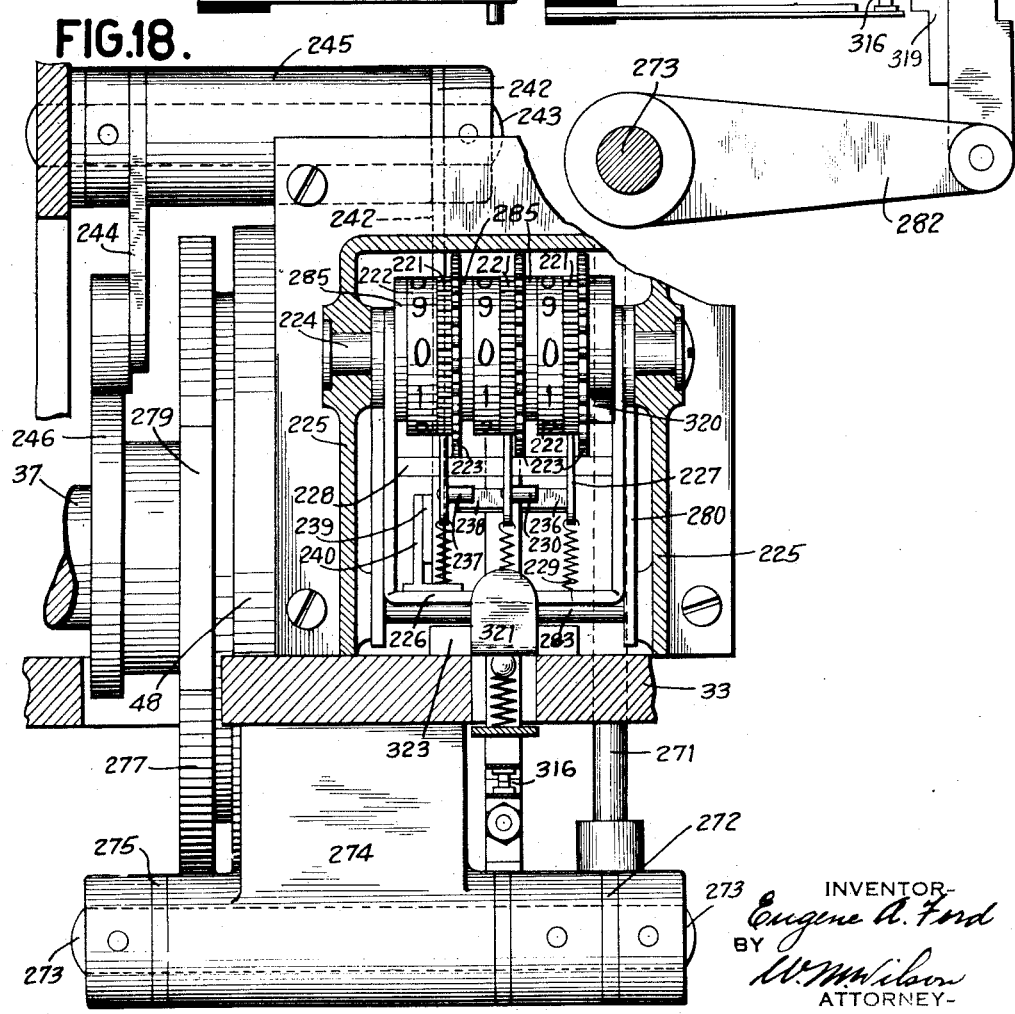
INVENTOR
Eugene A. Ford
BY
W. M. Wilson
ATTORNEY July 10, 1934.  E. A. FORD  1,965,975
GANG PUNCH
Filed April 15, 1933   9 Sheets-Sheet 9

INVENTOR-
Eugene A. Ford
BY
W. M. Wilson
ATTORNEY-

Patented July 10, 1934

1,965,975

UNITED STATES PATENT OFFICE 1,965,975

GANG PUNCH

Eugene A. Ford, Scarsdale, N. Y., assignor, by mesne assignments, to International Business Machines Corporation, New York, N. Y., a corporation of New York Application April 15, 1933, Serial No. 666,320

19 Claims. (Cl. 164—112)

This invention relates to punching machines and more particularly refers to machines for punching different sets of data simultaneously in a plurality of fields.

One object of this invention is to provide novel means simultaneously to punch a plurality of data in a plurality of fields.

Another object is to provide novel means to effect a printing of characters to indicate the interpretation of the punched data simultaneously with the punching of said data.

A further object is to provide novel means simultaneously to select one or more punches to punch data indicating holes and to select a printing character to indicate the values of the data.

Another object is to provide novel means to stop the machine after a predetermined number of cards have been punched.

Still another object is to provide novel means to interrupt the effectiveness of the card picker.

A further object is to provide novel means to stop the cards in position to be operated on.

Another object is to provide novel means to reverse the direction of travel of the ink ribbon.

Various other objects and advantages of my invention will be obvious from the following particular description of one form of mechanism embodying the invention or from an inspection of the accompanying drawings and the invention also constitutes certain new and novel features of the construction and combination of parts hereinafter set forth and claimed.

In said drawings:

Fig. 2 is a vertical section taken through the machine on line 2—2 Fig. 1.

Fig. 3 is a fragmentary detail view of the warning light.

Fig. 4 is a transverse sectional view taken on line 4—4 Fig. 1.

Figs. 16 and 17 are detail sectional views showing respectively the units counter wheel and the higher order wheels.

Fig. 18 is a fragmentary view in elevation of the card counter.

Fig. 24 is a facsimile of the card punched in the machine.

General description

Described in general terms the machine includes means for feeding cards successively from a card stack to feed rollers which in turn feed the cards past two sets of punches and into a card receptacle. The travel of the cards is momentarily arrested while the selected punches are operated to punch combinations of holes in two distinctly separate fields on each card. Simultaneously with the operation of the punches, printing mechanism is also operated to print data represented by the punched holes in a third field near the top of the card. The printed characters (see Fig. 24) in the upper line represent the data punched in the upper punched field and the printing in the lower line represents the data punched in the lower or bottom field. The code used for punching these data is illustrated in Figure 23, but it is to be understood that the invention is not limited to the use of the one code illustrated as any convenient code may be used.

A counter mechanism is provided to control the machine to punch a predetermined number of cards and to stop the machine after the last one of said predetermined number of cards has been punched.

The mechanisms comprising the machine are, generally speaking, mounted between two longitudinal frames 31 and 32 supported on a base 33

Figures 1, 23:
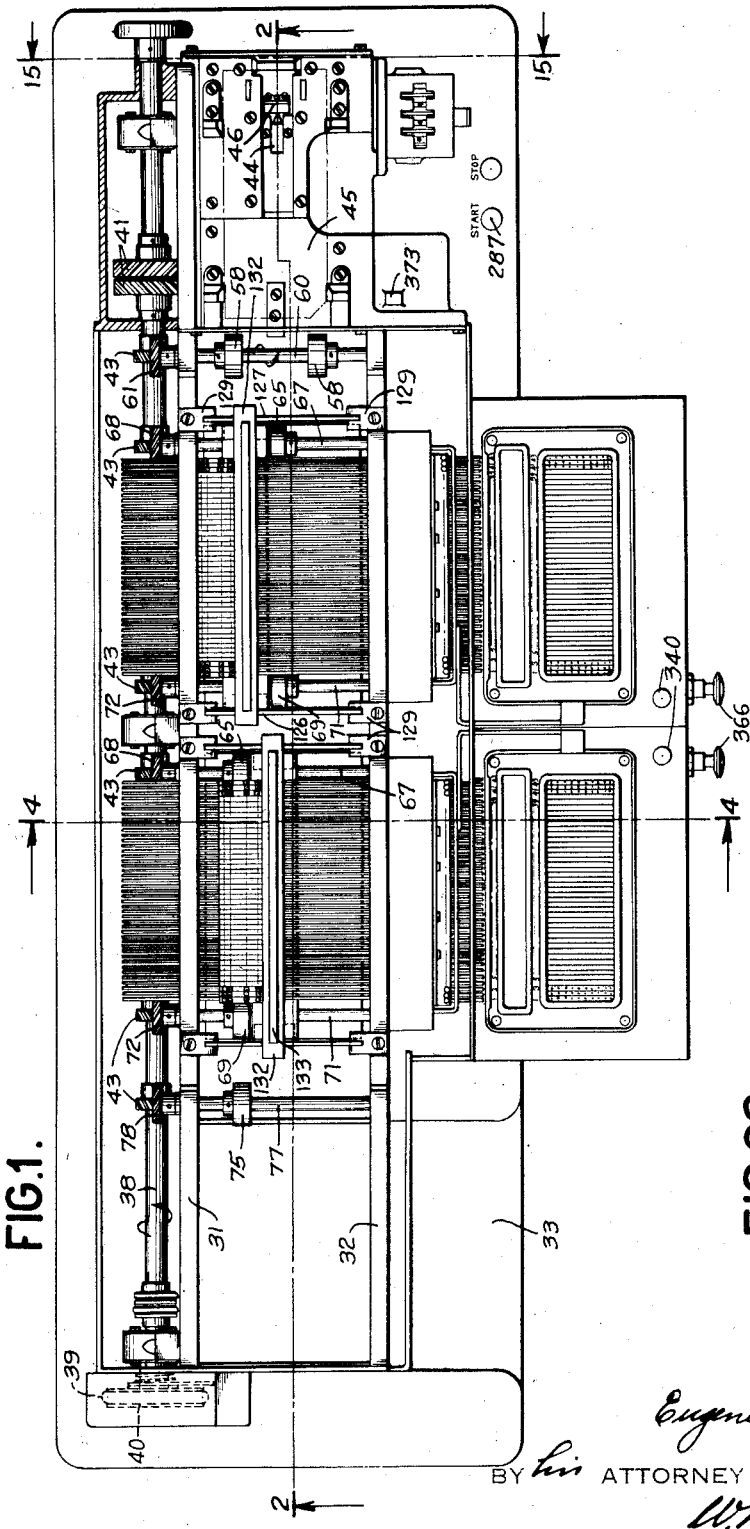
Fig. 1 is a top plan view of the machine.
Fig. 23 represents the code used in punching the numerical values.

(Figs. 1 and 4). The frames 31 and 32 are joined at intervals by cross frames 34, 35 and 36 (Fig. 2), the lower portions of which are formed into bearings for a cam shaft 37. The machine may be driven by any suitable means, none therefore being shown. The usual method, including an electric motor of suitable design, may be employed to drive a shaft 38 by means of gearing or by a conventional belt 39 (Fig. 2) which belt passes around a pulley 40 secured on the left hand end of the shaft 38 (Figs. 1 and 2).

Figure 15:
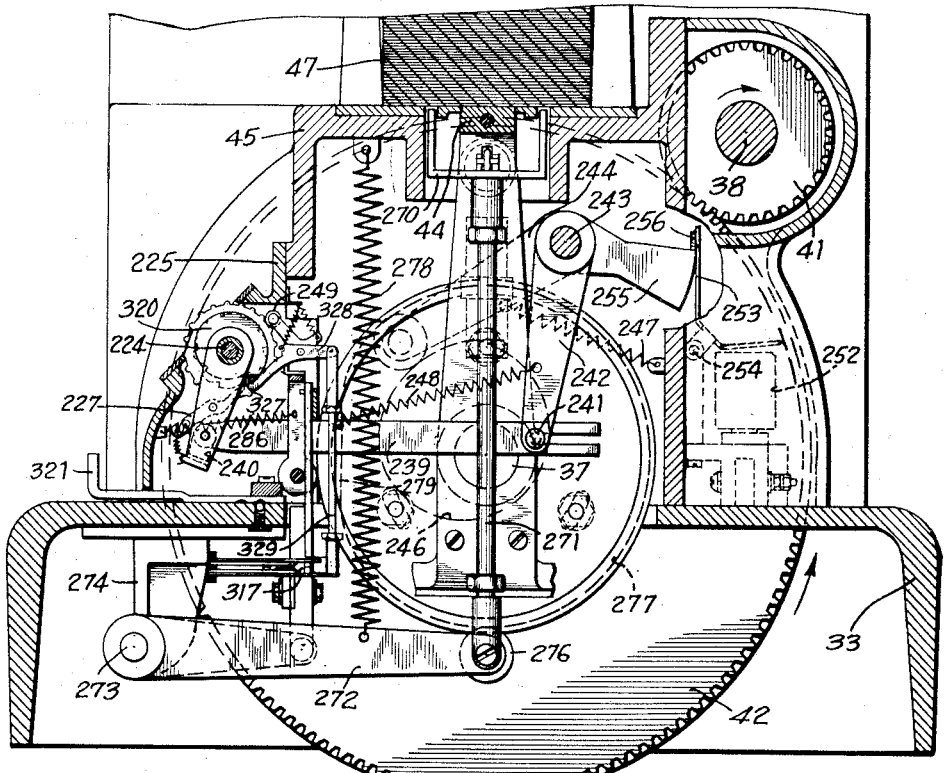
Fig. 15 is a sectional view taken on line 15—15, Figure 1 showing a part of the card picker and the card counter.

A pair of gears 41 (Figs. 1 and 15) secured to the shaft 38 mesh with large gears 42 (Figs. 2 and 15) secured to the cam shaft 37 serve to drive the latter shaft, the two sets of gears being provided to subdue the resultant gear noise.

The shaft 38 carries a series of spiral gears 43 (Fig. 1) which drive the feed rollers (to be described later). The cam shaft 37 (Fig. 2) operates the card picker, card counter, punch and printing mechanism, card stops, etc., all of which will be described in detail.

The card picker

The card picker includes a slide 44 mounted in a casting, or frame 45 secured to the right hand ends (Fig. 1) of the frame members 31 and 32. The slide 44 carries the usual picker knife 46, which, as the slide 44 reciprocates, feeds individual cards from the bottom of the card stack 47. A cam 48 secured on the shaft 37 cooperates with a roller 49 carried by an arm 50 pivotally mounted in a bracket 56 secured to the base 33. The shaft 37 makes one rotation at each card cycle and as the cam 48 rotates therewith a spring 57 causes the roller 49 to follow the contour of the face of the cam 48 which results in rocking the arm 50 first counter-clockwise (Fig. 2) and then clockwise to normal. This, due to the engagement of the free end of the arm 50 with the slide 44, moves said slide first leftwards to feed a card out of the stack 47, and then toward the right to retract the picker knife 46.

Card feed

Figure 5:
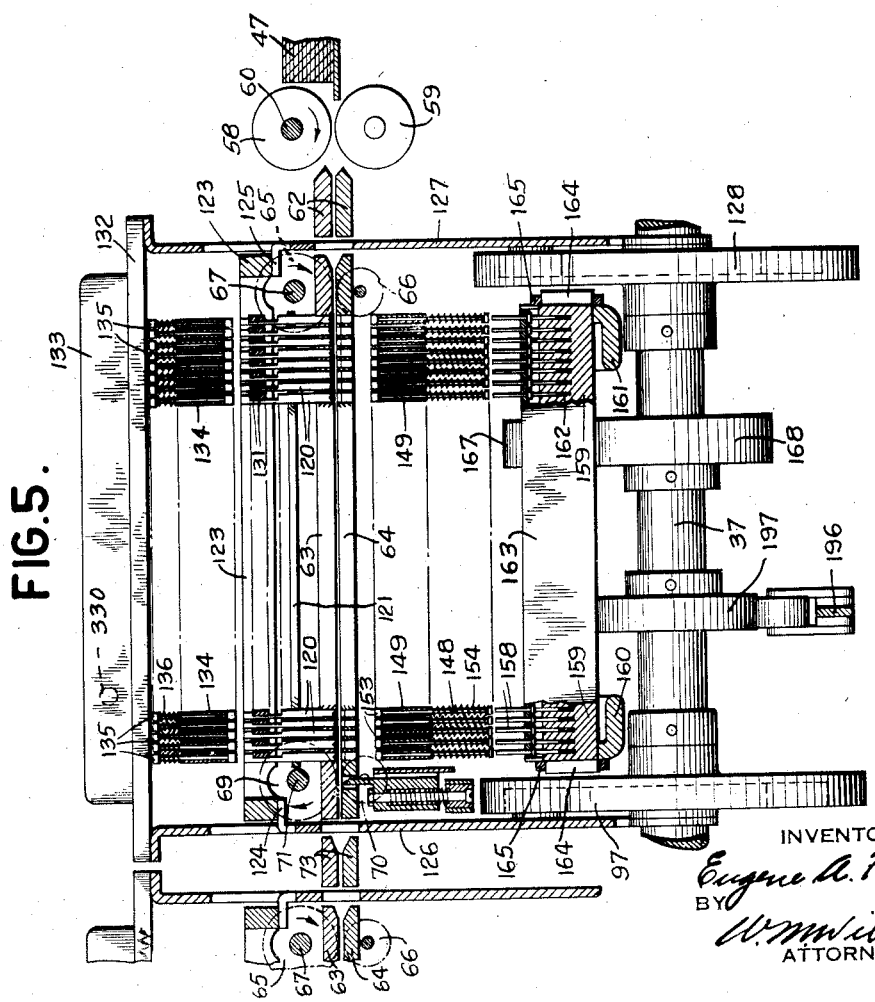
Fig. 5 is a sectional view taken through one of the groups of punches and showing also the associated printing mechanism.

When the card is thrust from the stack 47 by the picker knife 46 its leading edge comes between pairs of rollers 58 and 59 (Figs. 2 and 5), the former being secured on a shaft 60 (see Fig. 1) mounted between the frames 31 and 32, which shaft 60 carries a gear 61 meshing with one of the gears 43. The rollers 58 and 59 feed the card between guides 62 and into a channel formed between an upper punch plate 63 and a lower punch plate 64 suitably supported between the frames 31 and 32. As the card enters the channel it is picked up by a pair of rollers 65 and 66 which feed the card into the first punch station. The roller 65 is carried by a shaft 67 on the end of which shaft is secured a gear 68 meshing with a gear 43 on the shaft 38.

Near the left hand end of the first punch station (see Fig. 5) is a feed roller 69 mounted on a shaft 71. A gear 72 (Fig. 1) secured on this shaft meshes with one of the gears 43 to drive the roller 69. Just the card is released by the rollers 65 and 66 it is gripped by a pair of rollers 69 and 70.

A card stop (to be described later) is brought into operation to arrest the travel of the card with its leading edge slightly to the left of the vertical center line of the rollers 69 and 70 thus holding the card stationary while the punches and printing devices are operating thereon. After the punching and printing operation the card stop is withdrawn and the card is fed out of the first punching station, between a pair of guides 73 and into a second punching station substantially like the one first described, and which therefore will not be described in detail.

In the second punching station the travel of the card is again arrested while the punches and printing mechanism of this station punch and print in a different field on the card. The second punching and printing operation occurs exactly one card cycle after the first and both sets of punches operate simultaneously, the first set punching the first field in the following card as the second set is punching the second field in the preceding card.

After the card is operated on at the second punch station it is fed out through guide plates 74 (Fig. 2) to a pair of feed rollers 75 and 76, the roller 75 being mounted on a shaft 77 having a gear 78 thereon meshing with one of the gears 43 on the shaft 38. These rollers 75 and 76 feed the card under a spring retainer 79 onto a stack 80 of previously punched cards in a receptacle at the left hand end of the machine (Fig. 2) including an inclined platform 86 supported on a spring retained plunger 87.

Card stops

The devices for stopping the cards in positions to be operated on by the punches and printing devices will now be described. These devices are shown in Figures 8 to 12, inclusive, and it may be here noted that these card stop devices differ somewhat in details of construction due to the location of the associated feed rollers 69 and 70, one set of which rollers is located to the right of the second bank of punches (Fig. 8) and the other set of which rollers is located to the left of the second bank of punches (Fig. 10).

Figure 8:
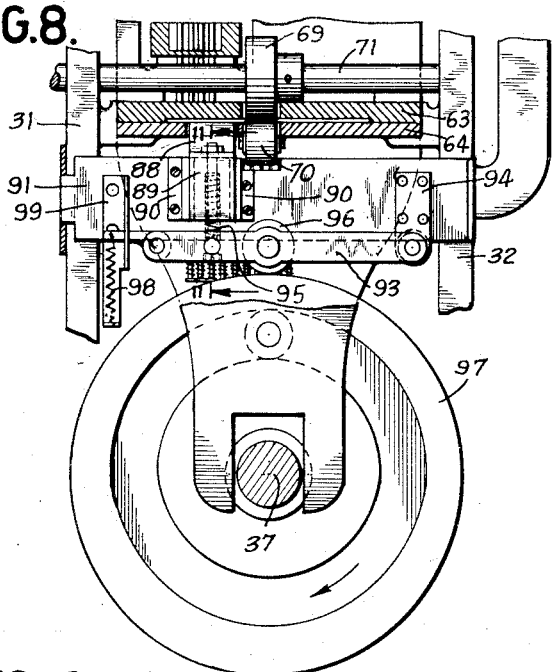
Fig. 8 is a detail view showing the card stop device and a part of the punch operating mechanism for the upper punches.
Figure 9:
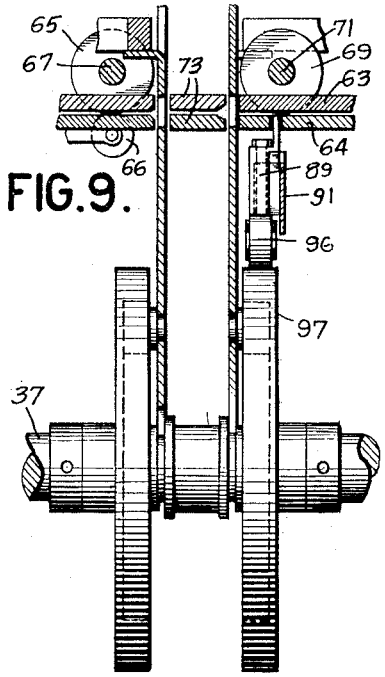
Fig. 9 is a detail sectional view of the punch operating mechanism and the card stop for the upper punch position.
Figure 10:
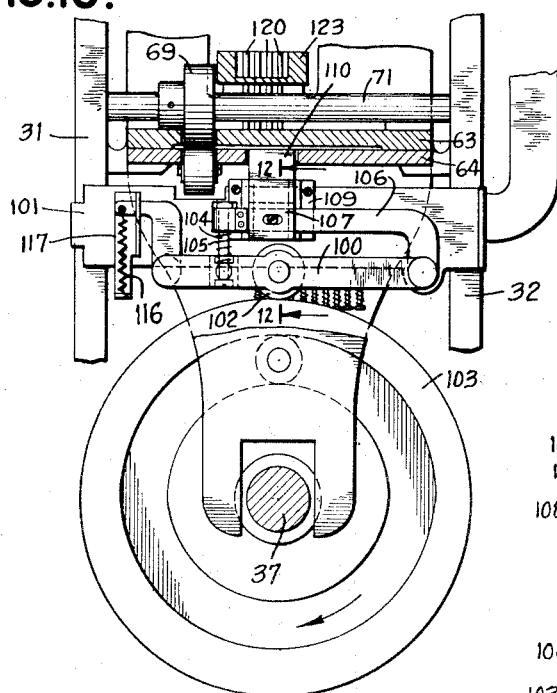
Fig. 10 is a detail view of the card stop and the punch operating mechanism for the lower punch position.

In Figure 8 is shown the card stop mechanism associated with the first, or right hand punch position (Fig. 2), and Figure 10 illustrates the card stop device used in connection with the second or left hand punch position (Fig. 2).

Referring to Figure 8 the card stop 88 projects upwardly from a carrier 89 mounted to slide vertically between brackets 90 secured to a bar 91 supported between the frames 31 and 32. The carrier 89 is connected by a rod 92 to a pair of cam levers 93, having their right hand ends (Fig. 8) pivotally supported by a bracket 94 secured on the bar 91 (see also Fig. 11). A spring 95 compressed between the carrier 89 and the lever 93 presses the carrier upwardly against a nut on the upper end of the rod 92. A roller 96 mounted between the levers 93 is held in contact with and caused to follow the configuration of the periphery of a cam 97 secured on the shaft 37 by a spring 98 stretched between the free end of the lever 93 and a bracket 99 supported on the bar 91, said bracket 99 also serving to guide the levers 93 as they oscillate under the influence of the cam 97.

The configuration of the cam 97 is such that upon rotation of the shaft 37 it rocks the levers clockwise at the proper time, thus by the spring 95 raising the carrier 89 and the card stop 88 until the stop comes into contact with the upper punch plate 63. The lever 93 receives a slightly greater movement than is necessary to raise the stop 88 against the plate 63, the additional movement being absorbed by the compression spring 95. The movement necessary to raise the stop 88 its full stroke is so slight that the configuration of the cam 103 to effect this movement is not apparent in the drawings.

After the punching and printing are effected the cam 97 acts to lower the stop 88 allowing the card to be fed by the rollers 69—70 to the next punching position where its travel again is arrested this time by the mechanism shown in Figure 10.

Referring to this figure it can be seen that a pair of levers 100 pivotally supported by a cross bar 101 between them carry a roller 102 cooperating with the periphery of a cam 103, also fast on the shaft 37. The levers 100 are connected by a rod 104, surrounded by a compression spring 105, to an arm 106 pivoted concentrically with the levers 100. The arm 106 extends through a horizontal slot in a stop carrier 107 and is operatively coupled thereto by a screw stud 108. The stop carrier 107 is vertically slidable between a pair of brackets 109 secured to the bar 101, and carries an upwardly extending card stop 110. A spring 116 stretched between the free end of one of the levers 100 and a bracket 117 on the bar 101 holds the roller 102 in contact with the cam 103. At the proper time this cam rocks the levers 100 clockwise and through the compression spring 105 rocks the arm 106 also clockwise to raise the carrier 107 and the card stop into the path of the approaching card, thereby arresting the travel of said card in the proper position to receive the punching and printing operations.

Figure 11:
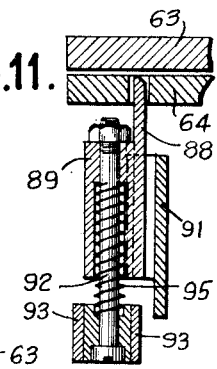
Figs. 11 and 12 are detail sectional views showing the card stops.
Figure 12:
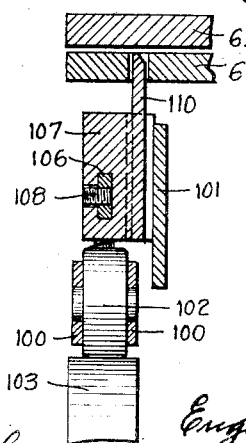

Referring to Figures 11 and 12 it will be noted that the upper edges of the stops 88 and 110, facing the approaching cards, are beveled. It was discovered in practice that when these stops have their upper ends cut square the impact of the cards thereagainst mutilated the leading edge of the card. When the stops 88 and 110 are beveled substantially as illustrated the velocity of the card is dissipated by the sliding action of the edge of the card as it is pressed into the notch formed by the beveled stop and the bottom of the plate 63 without damaging the edge of the card.

All of the feed rollers driven by the shaft 38 rotate continuously and when an advancing card meets a raised stop the roller 69 continues to rotate, merely slipping over said card until the stop is lowered, whereupon the roller immediately advances the card to the next position or into the card receptacle as the case may be.

*Punches*

There are two complete and independently operated sets of punches in the machine. One to perforate in the lower field indicated at 118 (Figure 24) at the first punching station, and the other to punch in the upper field of the card indicated at 119 (Fig. 24) at the second punching station. In structure and operation the sets of punches are identical excepting for their location with respect to the edge of the card channel. This difference of location is clearly illustrated in Figures 8 and 10. The punches shown in Figure 8 (see also Fig. 1) are located near the left hand edge of the channel as viewed in this figure and are adapted to punch in field 118 (Fig. 24). Those punches illustrated in Fig. 10 are located farther to the right, as viewed in this figure, and are adapted to punch in field 119 (Fig. 24). Since the above is the only difference in the sets of punches and their operating mechanism it is thought that a detailed description of one set of punches will suffice.

The right hand group of punches, as illustrated in Figures 1 and 2, will therefore be described. There are four punches 120 to punch one or two holes in each column on the card according to the code illustrated in Fig. 23.

Figures 6, 7:
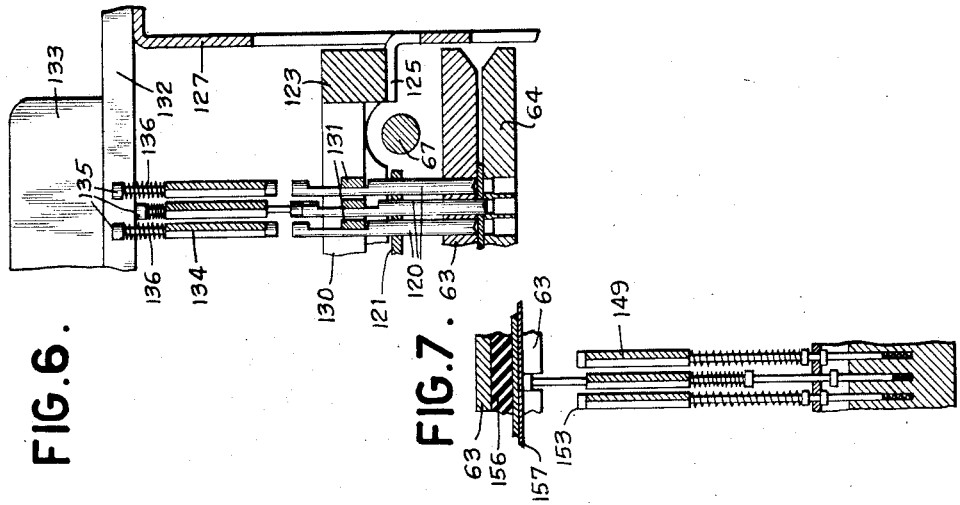
Fig. 6 is a detail view of a part of the punches.
Fig. 7 is a detail view of some of the type showing the method of actuating the selected type.

The punches 120 are slidable vertically in the punch plate 63 and in a plate 121 spaced above the plate 63 by longitudinal bars 122. The punches 120 extend upwardly through a rectangular frame 123 supported by ears 124 and 125 bent inwardly from vertically reciprocable pitmen 126 and 127, respectively. The pitmen 126 and 127 carry rollers projecting into cam grooves in the cam 97 and a cam 128 respectively. At their upper ends the pitmen 126 and 127 are guided by slotted blocks 129 secured to the tops of the frames 31 and 32 (see Fig. 1), the lower ends of said pitmen being bifurcated to straddle the shaft 37. Fitting within the frame, and properly spaced apart by suitable combs 130 is a plurality of bars 131, there being a bar 131 for each columnar set of four punches 120. The bars 131 extend through recesses in the sides of the punches 120 (see Figs. 5 and 6). The purposes of these bars is to normally retain the punches in their raised positions clear of the card, and to restore the punches to normal positions after they have been operated.

Figure 13:
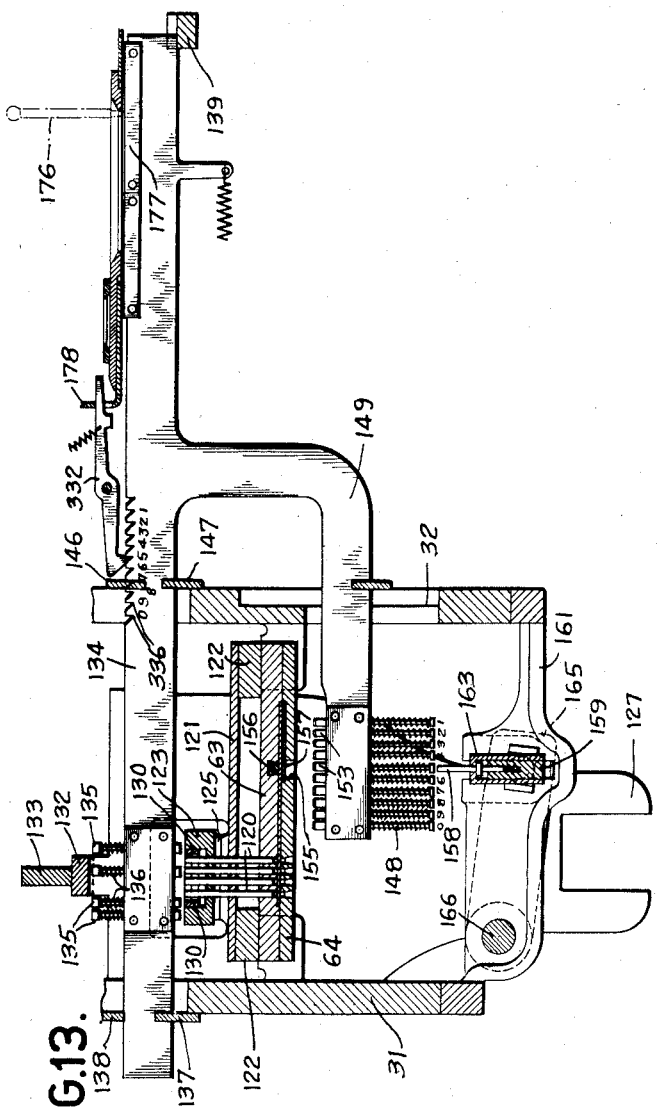
Fig. 13 is a detail view showing the setting slide for the punch and type selectors.
Figure 14:
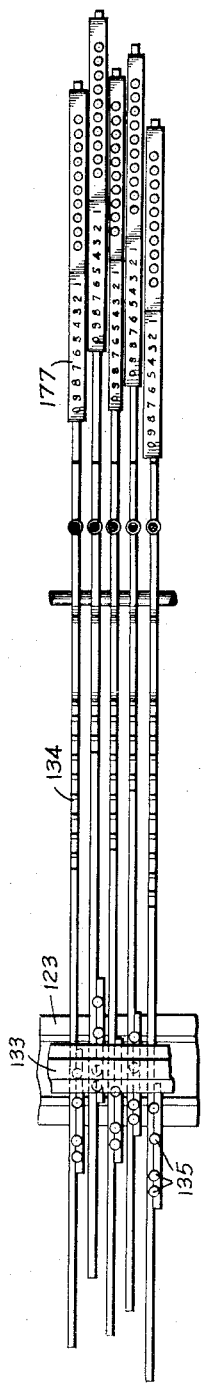
Fig. 14 is a top plan view of some of the selector slides.

Across their upper ends the pitmen 126 and 127 carry a punch operating bar 132 (Figs. 4, 5 and 13) upon which is superimposed a reenforcing bar 133. Between the operating bar 132 and each columnar group of punches is a setting slide 134 each of which slides carries a group of four interposer plungers 135 normally held in their raised positions by springs 136 (see Fig. 6). The left hand ends of the slides 134 are supported and guided by a comb 137 and a bar 138 secured to the frame 31 (Figs. 4 and 13) and the right hand ends of said slides rest in slots in the upper side of a bar 139, resting on brackets 140 secured to and projecting forwardly from the frame 31. Near their mid-portions the slides 134 are guided by combs 146 and 147 secured to the frame 32.

The slides 134 are adjustable to any one of eleven positions from "0" to "blank". Thus in Figure 4 the slide 134 is shown in its "blank" position and by examination of this figure it may be observed that all of the interposers 135 are out of alinement with the operating bar 132. If the slide is moved one position to the right, as viewed in this figure, the right hand one of the interposers 135 is brought into alinement with the left hand punch 120 and below the operating bar 132, which upon operation will punch a hole in the "1" position according to the code illustrated in Figure 23. If moved two steps toward the right the first interposer is brought between the bar 132 and the second punch, if moved three spaces the first and second interposers are brought between the bar 132 and the third and first punches, etc. Thus the representation of all of the digits represented in the code (Fig. 23) may be punched in each column by correspondingly setting the slides 137.

After the desired slides are set to the desired positions, the machine is operated, in a manner to be later described, and, upon rotation of the shaft 37, the cams 97 and 128 lower their respective pitmen 126 and 127, which in turn lowers the frame 123 and the operating bar 132. The frame 123 carries the bars 131 downwardly freeing the plungers to the action of the selected interposers which under the influence of the bar 132 forces the selected punches through the card. The upward movement of the frame 123 and 131 raise the punches to their normal positions, the displaced interposers being restored by their springs 136.

Means is provided to carry the punchings out of the machine to prevent their accumulation and interference with the proper operation of the machine. This means includes a pan 141 (Fig. 4) having its bottom inclined and its right hand edge slidably supported in blocks 142 (only one being shown) projecting downwardly from the punch plate 64. The pan 141 is pivotally connected to a flexible arm 143 having its lower end fixed in a block 144 secured to the base 33 of the machine. The upper end of the arm 143 is curved back on itself as at 145 and the inherent spring tension of the arm 143 holds the part 145 against a cam 150 on the shaft 38.

As the cam 150 rotates it vibrates the arm 143 and thus reciprocates the pan 141 to shake the punchings into a chute 151 which conducts them to a removable receptacle 152 in the base of the machine.

Printing mechanism

Simultaneously with the operation of the punches, printing mechanism is operated to print characters indicating the data punched in each column. This printing mechanism includes a series of type carriers 148 (Figs. 4, 5, 7 and 13) slidably mounted in projections 149 of the slides 134. Each of the carriers 148 is provided with a type character 153. Springs 154 normally restrain the type carriers in their lowermost positions and restore the displaced carrier to such position.

When the slide 134 is adjusted to select the desired punches 120, the particular type carrier 148 bearing the character corresponding to the data to be punched in the card is brought directly under an opening 155 in the lower punch plate 64.

At this opening the card passes between a platen 156 in the upper punch plate 63 and an ink ribbon 157 adapted to travel in a recess in the lower punch plate 64. When upper end of the carrier 148 is in alinement with the platen 156 the lower end thereof rests directly above an operating plunger 158 which is moved upwardly at the proper time to thrust the type carrier upwardly for the purpose of taking an impression from the type character on the card. It is to be understood that there is a plunger 158 provided for each card column, consequently a character will be printed in each column having its slide 134—149 set to a significant position.

The plungers 158 are carried in a bar 159 (see Figs. 4, 5, and 13) having its ends guided in vertical slots in cross brackets 160 and 161 secured to the frames 31 and 32. The plungers 158 are restrained in the bar 159 against the action of springs 162 by an inverted channel bar 163 secured to the bar 159. Square studs 164 are pivotally mounted on the ends of the bar 159. Square studs 164 pivotally mounted on the ends of the bar 159 are embraced by rectangular openings in arms 165 secured on a shaft 166 mounted in the brackets 160 and 161. An arm 167 also secured on the shaft 166 cooperates with a cam 168 on the shaft 37 which makes one complete clockwise rotation at each card cycle.

After the card has been stopped, as set forth above, in punching position, the cam 168 rocks the arm 167, shaft 166 and arms 165 counterclockwise (Fig. 4) raising the bar 159. At this movement the plungers 158 come into contact with the selected type carriers 148 thrusting said carriers upwardly to take the impression, the punching and printing operations occurring at approximately the same time. The type operating bar 158 is then lowered to permit the card to be fed to the next position or onto the stack 80 (Fig. 2).

It will be remembered that the punches in the right hand position (Fig. 2) punch in the lower position 118 (Fig. 24). The printing in this card position is effected in the lower printing position as indicated at 169 (Fig. 24). This is clearly illustrated in Figure 13 wherein it may be observed that the punches are located near the left hand edge, or bottom of the card, whereas the platen 156 is spaced some distance from the right hand edge or top of the card, the card being placed in the machine face down. Referring now to Figure 4 which represents a sectional view through the left hand punch position (Figs. 1 and 2) it may be noted that the punches are spaced a considerable distance from the bottom of the card, whereas the platen is located near the top of said card to print in the upper position indicated at 170 (Fig. 24).

The slides 134 (Fig. 13) are set manually by inserting a stylus, indicated by dot and dash lines at 176 (Fig. 13), into the proper one of a series of holes in a bar 177 secured to the slide, and drawing the slide forward until the stylus strikes the wall of a framed opening in the cabinet 178.

Ink ribbon feeding and reversing mechanism

The ink ribbon 157 (Figs. 4, 13 and 21) is adapted to be alternately wound and unwound from two spools 179 and 180 (Fig. 21) mounted on shafts 181 and 182 respectively. Secured to the shafts 181 and 182 are ratchet wheels 183 and 184 respectively. The ratchet wheel 183 and spool 179 are adapted to be rotated by the reciprocatory movement of a feed pawl 185 having a projecting tooth 186 adapted to engage the teeth of the ratchet 183 to rotate said ratchet in a counterclockwise direction.

The pawl 185 is pivotally carried by one arm of a lever 187, the other arm of the lever being connected by a link 188 to a cam arm 189 (see also Fig. 4) pivoted in a bracket 190 secured to the base 33 of the machine. The arm 189 carries a projection 191 upon which is mounted a roller cooperating with a cam 192 on the shaft 37.

Figure 21:
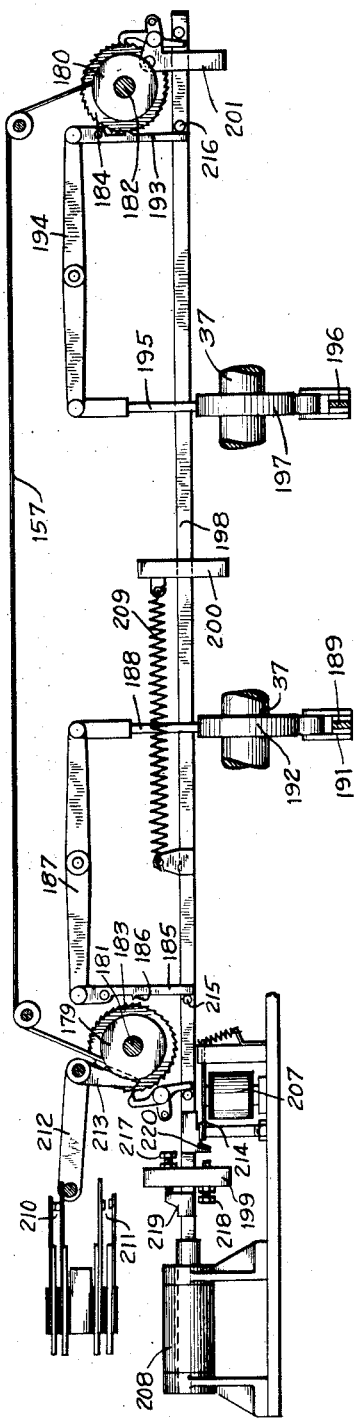
Fig. 21 is a detail view of the ink ribbon feeding and reversing mechanism.

As illustrated in Figure 21 the pawl 185 is held out of cooperative relation with the ratchet 183 since the ribbon is all wound on the spool 179. This permits free rotation of this spool in order that the ribbon may be unwound therefrom and wound onto the spool 180. Cooperating with the ratchet 184 is a feed pawl 193 pivotally carried by one arm of a lever 194 having its other arm connected by a link 195 to a cam arm 196. This cam arm carries a roller cooperating with a cam 198 on the shaft 37. The pawls 185 and 193 are urged into cooperative relation with their respective ratchets by springs (not shown).

Upon rotation of the shaft 37 and cam 197 the cam arm 196 is rocked, at the proper time, to lower the link 195, rocking the lever 194 counterclockwise to raise the pawl 193, thus rotating the ratchet 184 and spool 180 in a clockwise direction. This continues at each rotation until the ribbon is unwound from the spool 179 and is wound on the spool 180 at which time mechanism is brought into action to disconnect the pawl 193 from its ratchet 184 and to render the pawl 185 effective to rotate the ratchet 183, thus rewinding the ribbon on the spool 179. This reversing mechanism includes a link 198 horizontally slidable in brackets 199, 200 and 201 secured to the frame 31.

The link 198 is controlled by a magnet 207, a solenoid 208 and a spring 209, the magnet 207 and solenoid 208 being under the control of a pair of switches 210 and 211, respectively. These switches are adapted to be opened and closed by an arm 212 under the control of the ribbon as wound or unwound on the spool 179. When the ribbon is all on the spool 179 an arm 213 connected to the arm 212, and which is held in contact with the ribbon on the spool 179, rocks the arm 212 clockwise and closes the switch 210 which energizes the magnet 207. This magnet immediately attracts its armature 214, releasing the link 198 to the action of its spring 209 which immediately draws the link to the right (Fig. 21).

The mechanism is illustrated in this condition in Figure 21. As the link 198 moves toward the right, a stud 215 thereon rocks the pawl 185 out of cooperative relation with its ratchet 183, and, at the same time, a stud 216 permits a spring (not shown) to rock the pawl 193 into cooperative relation with its ratchet 184.

The pawl 193 continues to wind the ribbon on to the spool 180 until it is exhausted from the spool 179 at which time the arm 212 effects a closure of the switch 211 to energize the solenoid 208 which draws the link 198 toward the left (Fig. 21). At this movement of the link 198, the stud 216 rocks the pawl 193 out of engagement with its ratchet 184 while the stud 215 permits a spring (not shown) to engage the pawl 185 with its ratchet 183.

As soon as the solenoid 208 draws the link 198 leftward the armature 214 of the magnet 207, under the influence of its spring, latches the link in its left hand position.

Means, including a pair of stop screws 217 and 218 in the bracket 199, are provided to adjustably limit the extent of travel of the link 198. The screw 217 is adapted to coact with a projection 219 carried by the link 198 and the screw 218 limits the leftward travel of the link by a projection 220 on said link.

*Card counter*

A subtraction counter is provided which may be set manually to a predetermined number, representing the number of cards to be punched. As the machine is operated "1" is subtracted from the counter until said counter reaches "0" when mechanism is brought into action automatically to stop the machine. The counter includes a plurality of counter ratchet wheels 221 (Fig. 18) each having secured thereto a reading wheel 222 and a knurled setting wheel 223. As many counter wheels may be provided as are necessary, there being illustrated herein three sets of wheels 221, 222 and 223 mounted on a rod 224 supported in a frame 225 secured to the base 33 and the frame 45.

In order to operate the counter to subtract "one" at each card cycle a bail 226 pivoted on the rod 224 carries a plurality of pawls 227 supported on a rod 228 supported between the arms of the bail. The pawls 227 cooperate with the ratchet wheels 221 being urged into engagement therewith by springs 229. The units pawl 227 is normally in engagement with its ratchet but the tens pawl is held out of cooperative relation with its ratchet by a stud 230 thereon resting on an ear 236 projecting from the units pawl. Similarly the hundreds pawl is held out of engagement with its ratchet by a stud 237 resting on an ear 238 projecting from the tens pawl.

The bail 226 is oscillated at each card cycle to subtract "one" from the units counter wheel. The left hand end (Fig. 15) of a link 239 is pivotally connected to a bracket 240 secured to the bail 226, the right hand end of the link 239 being slotted to receive a stud 241 on the lower end of an arm 242 journaled on a rod 243 and is connected to a cam arm 244 by a hub 245. The arm 244 carries an anti-friction roller cooperating with a cam 246 on the shaft 37 (see also Fig. 18).

As the cam 246 rotates, the arms 244 and 242 rock counterclockwise under the influence of a spring 247, the arm 242 drawing the link 239 therewith toward the right by a spring 248 stretched between the arm 242 and the hub, thus rocking the bail 226 counterclockwise. At this movement the units pawl 227 advances its ratchet wheel 221 one step to subtract "one" therefrom. The cam 246 then reverses the movement to restore the bail 226 clockwise to normal retracting the pawls 227. Spring pressed rollers 249 carried on bell cranks 250 pivoted on a rod 251 serve to prevent accidental displacement of the counter wheel units.

The number of cards to be run through the punching machine is set up on the counter wheels by use of the knurled wheels 223. Obviously, when the units wheel passes from "zero" to "9" in the operation of the machine, it is necessary to turn the tens wheel from "1" to "0". This is accomplished by the usual deep notch transfer or carry mechanism. This carry device includes a deep notch in the zero position of each of the units and tens counter wheels, which notch, when the units wheel arrives in zero position permits the units pawl 227 to move into said notch. This additional movement of the units pawl permits the tens pawl to move into engagement with its ratchet wheel 221.

At the next succeeding card cycle simultaneously with the movement of the units wheel from "0" to "9", the tens wheel is rotated one step to the "9" position. Likewise when the deep notches in the units and tens ratchets are in alinement in the zero position they permit a still greater movement of the pawls 221 to bring the hundreds pawl into engagement with its ratchet to effect a carry from the tens to the hundreds order wheel.

The card counter is operated under the control of a magnet 252 (Figs. 15 and 22) the armature 253 of which is in the shape of a bell crank pivoted at 254. This bell crank is spring urged in a counterclockwise direction against a tail 255 of the cam arm 244. In this position, as long as the magnet 252 is not energized, a projection 256 rests in the path of the tail 255 preventing counterclockwise movement of the arms 244 and 242, thus preventing operation of the counter. Energization of the magnet 252 rocks the armature 253 clockwise carrying the projection 256 out of the path of the tail 255, freeing the arms 244 and 242 for operation by the cam 246 and spring 247.

Figure 19:
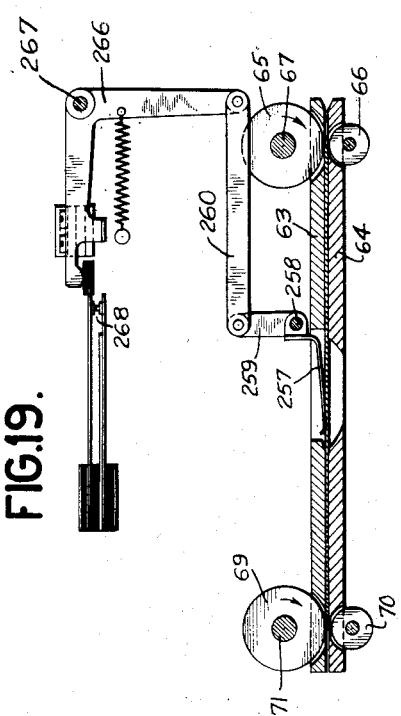

The magnet 252 is energized under the control of a card lever 257 (Fig. 19) in the second or left hand punching position (Fig. 2). The punch plates 63 and 64 are recessed to receive the lever 257 which normally rests in its lower or counterclockwise position. When a card is fed through the card channel between the plates 63 and 64 the leading edge of the card rocks the lever 257 clockwise about its pivot 258. This also rocks clockwise an arm 259 connected by a link 260 to the downwardly extending arm of a bell crank 266 pivoted on a stud 267. The other arm of the bell crank projects above the upper blade of a switch having normally open contacts 268.

The clockwise rotation of the card lever 257, due to the passage of a card thereby, rocks the bell crank 266 counterclockwise to close the contacts 268 thus energizing the magnet 252 for the purpose set forth above. As soon as the card has passed the lever 257 a spring 269 restores the parts to normal positions opening the contacts 268.

This operation is repeated for each card, and, if for any reason a card fails to feed from the stack 47, the counter operating mechanism will be rendered ineffective to operate the counter. Thus when the last card of a predetermined number of cards has passed the card lever 257 the counter is disabled until another number is set thereon and the machine is again started.

*Card picker interrupting means*

Referring to Figure 2 it may be noted that after the last card of a group has been fed to the first punching position it requires two card cycles to feed said last card to the second punching position and to the stack 80. It is, therefore, necessary to interrupt the card picker two card cycles before the machine is stopped under the control of the card counter as it arrives at zero position. This is accomplished by lifting the card stack 47 above the effective range of the picker knife 46 just before the knife 46 operates to feed the card. This mechanism includes a two pronged lifter 270 (Fig. 15) straddling the picker slide 44 and being mounted on the upper end of a vertical rod 271. At its lower end the rod 271 is pivoted to end of an arm 272 secured to a shaft 273 mounted in a bracket 274 suitably supported on the base 33 of the machine.

On the opposite or left hand end of the shaft 273 (see Fig. 18) is secured an arm 275 the outline of which arm coincides with the outline of the arm 272. The arm 275 carries a roller 276 (Fig. 15) normally urged upwardly against the periphery of a cam 277 integral with the cam 48, by a spring 278.

The cam 277 normally prevents upward movement of the rod 271, however, just before the cam 48 (Fig. 2) permits operation of the picker slide, a flat portion 279 of the cam 277 arrives opposite the roller 276. Operation of the lifter 270 is prevented at this time by a bail 280 obstructing the upward movement of a slide 281 (Fig. 17) pivoted to an arm 282 secured on the shaft 273. The bail 280 is supported on a rod 283 and is normally held in the path of the slide 281 by a series of fingers 284 secured thereon, resting on the peripheries of discs 285, one secured to each of the counter wheels. The disc 285 for the units wheel is recessed opposite the "0", "1" and "2" positions and the discs for the tens and hundreds orders are recessed only opposite the "zero" position consequently, as the number is being run off of the counter, during operation of the machine, the recesses come opposite their fingers 284. The bail 280 will be held in the path of the slide 281 until the units wheel reaches the "2" position at which time the recesses are all in alinement and permit the fingers 284 and the bail 280 to rock counterclockwise under the influence of a spring 286. The slide 281 is then free to rise but is prevented from so doing by the cam 277 until the flat 279 comes opposite the roller 276, whereupon the spring 278 raises the arm 272, rod 271 and the lifter 270 which presses the card stack upwardly out of the path of the picker knife.

As soon as the knife 46 has passed the edge of the card the cam 277 again lowers the lifter 270. This operation will be repeated until the last card is fed out of the machine, when, as the counter is turned from "one" to "zero", and the units wheel arrives at zero, it controls means to stop the machine.

*Electrical circuit*

Before proceeding with a description of the several controls provided to insure proper operation of the machine, a description will be given of the electrical circuits of the machine.

Figure 22:
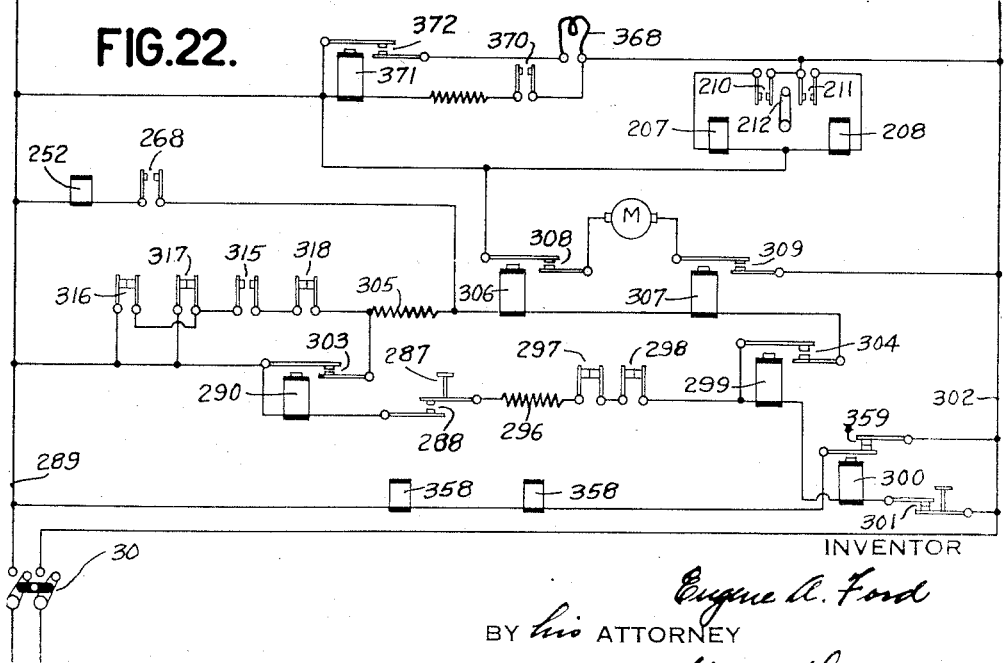
Fig. 22 is a schematic circuit diagram of the starting, stopping and operating circuits.
Figure 20:
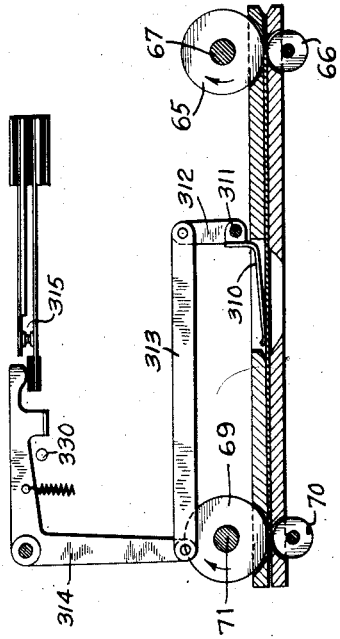
Figs. 19 and 20 are detail views showing the card levers and the electrical contacts operated thereby.

Referring to Figure 22, the machine is adapted to be driven by an electrical motor M of suitable design. After the slides 134 have been set and cards placed in the hopper as indicated at 47 the machine is started operating by depressing a start key 287 (Figs. 1 and 22) closing contacts 288 which set a circuit as follows: From the line 289 through a magnet 290, contacts 288, a resistance 296, normally closed contacts 297 and 298, magnets 299 and 300, stop key contacts 301 to the line 302. This energizes magnets 290 and 299 closing their respective contacts 303 and 304 which establishes a circuit from the line 289, contacts 303, resistance 305, motor relay magnets 306 and 307, contacts 304, magnets 299 and 300, stop key contacts to the line 302. Energizing the magnets 306 and 307 closes their respective contacts 308 and 309 establishing a circuit through these contacts and the motor M, thus starting the motor. It is necessary for the operator to hold the start key 287 depressed until the first card passes under a card lever 310 (Fig. 20).

This lever is mounted on a rod 311 and, when rocked clockwise by a card, through an arm 312 and a link 313, rocks a bell crank 314 counterclockwise to permit a pair of contacts 315 to close thus setting up a circuit from the line 289 through card lifting contacts 316, counter contacts 317, card lever contacts 315, full pocket contacts 318, resistance 305, magnets 306 and 307, contacts 304, magnets 299 and 300, stop key contacts to line 302. This circuit holds the motor relays 306 and 307, and the magnet 299 energized to keep the machine running until the relays 306 and 307 are deenergized by other means.

The machine may be stopped by opening of both of the contacts 316 and 317 under the control of the counter as said counter reaches "zero", opening the card lever contacts 315, the full pocket contacts 318 or by the stop key contacts 301.

The contacts 316 are normally closed and are opened by the card lifter control slide 281 (Fig. 17) when the tens and hundreds counter wheels stand at zero and the units wheel reaches the "2" position permitting the bail 280 to free the slide 281, which then rises, as above set forth, to interrupt the card feed. The slide 281 carries a block 319 which on its upward movement contacts the blade carrying the upper contact 316 and opens said contacts. Since the contacts 316 and 317 are wired in parallel the machine will continue running after the contacts 316 are opened and until contacts 317 are also opened.

These contacts are opened under the control of a disc 320 (Figs. 16) secured to the units counter wheel. A shoulder 326 comes opposite a nose 327 on a lever 328 pivoted on the rod 251 and spring urged in a clockwise direction, exactly at the time the units counter wheel reaches the zero position. This allows the lever 328 to rock clockwise to lower a rod 329 thus opening the contacts 317. At this time the last card is under the card lever 257 (Fig. 19) holding the contacts 268 closed. This maintains the machine running until the card is fed out of the second punching position when the lever 257 is free to open the contacts 268, thus deenergizing the motor relay magnets 306 and 307 and stopping the machine.

It is sometimes desirable to run an indeterminate number of cards through the punching machine. In such cases the card lifter 270 (Fig. 15) is prevented from rising to disable the card feeding operation. This is accomplished by shifting a slide 321 (Fig. 17) toward the right, interposing the end of said slide in the path of a shoulder 322 on the slide 281, thus obstructing operation of the card lifting mechanism. The slide 321 is mounted betwen the base 33 and a bar 323 secured to said base, and is retained in one of its two positions by a spring pressed retainer 324 cooperating with one of two notches 325 in the slide.

When the machine is operated with the slide 321 in its effective position, the counter mechanism is operated, but, due to the fact that the slide 281 is prevented from upward movement, the contacts 316 remain closed. Thus the machine is maintained in continuous operation even though the lever 328 drops into the shoulder 326 and opens the contacts 317.

In order to throw the machine back under the control of the counter it is only necessary to draw the slide 321 toward the left to its ineffective position.

Provision is made to keep the machine running if the picker knife 46 fails to feed a single card but to stop the machine in case the picker fails to feed more than one card in succession, and to stop the machine when the supply of cards in the stack 47 is exhausted. This is accomplished under the control of the two card levers 257 and 310 and their respective contacts 268 and 315. When the picker skips just one card the following condition is set up. The card just punched in the first punching position is fed to the second punching position. When the punches are operated to punch the card now in the second punch position a pin 330 (Figs. 5 and 20) projecting from the punch operating bar 133 permits the bell crank 314 to rock (there being no card at this time under the card lever 310) to open the contacts 315. However, the contacts 268 are held closed by the card in the second position, which keeps the machine running until the punch operating bar 133 (Fig. 5) is raised. When this occurs the pin 330 rocks the bell crank 314 counterclockwise permitting the contacts 315 to close. The machine is thus kept running when the card in the second position is fed out of the machine permitting the contacts 268 to open. Simultaneously with the feeding of this card out of the second position a card is fed into the first position so that the contacts 315 are held closed under control of the lever 310 while the punch bar 133 is lowered removing the pin 330 from the bell crank 314.

Thus it can be seen that the machine will continue operating until both the card levers 257 and 310 are allowed to drop due to the absence of cards in both positions. This opens the contacts 315 and 268 thus deenergizing the motor relays 306 and 307 and stops the machine.

Provision is also made to stop the machine when the receptacle into which the cards are fed after the final punching operation is full. When this condition obtains the pair of contacts 318 (shown only in Fig. 22) is opened. This does not at once stop the machine, but, as soon as the card in the second punching position is fed out from under the card lever 257 (Fig. 19) the contacts 267 open deenergizing the motor relay magnets 306 and 307 and the magnet 299 thus opening the contacts 308 and 309 to stop the motor M. As soon as the cards are removed from the card receptacle the contacts 318 are again closed. This, however, does not energize the motor relay magnets 306 and 307 since the contacts 304 were opened when the magnet 299 was deenergized. In order to start the machine under this condition it is necessary to depress the start key 287 closing the contacts 288. This immediately energizes the magnet 299 closing the contacts 304 and establishing a circuit through the contacts 316, 317, 315 and 318, resistance 305, motor relays 306 and 307, contacts 304, magnets 299 and 300, through the stop key contacts to the line 302. In this case the operator may release the start key immediately.

*Controls*

The slides 134 (Fig. 4) are normally locked against adjustment and can only be unlocked for adjustment when the machine is in a definite home position. The locking device includes a pawl 331 (Figs. 4 and 13) forming one arm of a lever 332 the other arm 333 of which projects through the cabinet where it is accessible to enable the operator to manually release an individual slide. A lever 332 is provided for each slide of both groups of slides. Associated with each group of levers 332 is a bail 334 having its arm pivoted on a rod 335. This bail normally rests beneath a projection on the arms 333 of all of the levers 332 of its associated group, thus locking the pawls 331 in one of a series of notches 336 in the upper edges of the slides 134. In order to free the levers 332 for operation it is necessary to rock the bail 334 counterclockwise from the position in which it appears in Figure 4. The bail 334 is normally latched in its locking position by a notch in the lower edge of a lever 337 held in engagement with a projection 338 on one arm of the bail by a spring 339. The lever 337 may be rocked clockwise to free the bail by depressing a key 340 having its stem pivoted to the lever 337. As soon as the key 340 is depressed the lever 337 rocks to free the bail 334, which is immediately rocked counterclockwise (Fig. 4) by a spring 341 stretched between a bracket 342 secured to the punch plate 64 and a lever 343 connected to the bail 334 by a link 344.

If the machine is in its home position a notch 345 in the periphery of the cam 128 is positioned opposite a projection 346 on the lower end of the lever 343 permitting the full extent of movement of said lever and of the bail 334 to free the levers 332.

However, if the machine is not in its home position the projection 346 strikes the periphery of the cam 128 limiting the movement of the lever 343 and the bail 334 which, in this case is not permitted sufficient movement to free the levers 332. Should this condition obtain the operator brings the machine to its home position by manually rotating the shaft 38 through the medium of a hand wheel 347 (see Figs. 1 and 2) as soon as the machine arrives at its home position the projection 346 enters 345 thus freeing the levers 332 and at the same time locking the machine against operation until the bail 334 is restored to its locking position.

It is impossible to depress the key 340 or to rock the lever 337 to free the bail 344 while the machine is in operation due to a magnetically controlled locking device which is effective to lock a link 348 against vertical movement during operation of the machine. The link 348 is pivoted to the lever 337 and has a projection 349 thereon normally engaged while the machine is running, by an arm 350 of an armature 356 under the influence of a spring 357. As soon as the machine stops a magnet 358 is energized, rocking the armature 356 clockwise to free the link 348.

A magnet 358 is provided for each of the two punching units of the machine. These magnets are connected in series (Fig. 22) and are energized when the machine stops by contacts 359 controlled by the magnet 300. It will be remembered that this magnet is energized when the start key 287 is depressed to start the machine and remains energized until the motor relay magnets 306 and 307 and the magnet 299 are deenergized to stop the machine.

While the machine is running and the magnet 300 is energized the contacts 359 are open and the magnets 358 are deenergized permitting the springs 357 (Fig. 4) to rock the armatures 356 to lock the links 348. However, when the motor relay circuit is broken to stop the machine the magnet 300 becomes deenergized permitting the contacts 359 to close thus establishing a circuit from line 289, magnets 358, contacts 359 to line 302. This energizes the magnets 358 which rock their armatures 356 clockwise to free the links 348. The key 340 may now be depressed to free the bail 334 to its spring which rocks said bail to free the levers 332 for operation.

The operator may now shift any one of the slides 134 by depressing the arm 333 associated with the particular slide, or, if a plurality of slides are to be adjusted, the levers 332 may all be rocked to ineffective positions by pressing downwardly on a lever 360 pivoted on a rod 361. This lever is attached to a bail 362 common to all of the levers 332 and upon rocking said lever 360 the bail 362 is rocked downwardly therewith rocking all of the levers 332 thus freeing all of the slides of that particular group.

As soon as the slides 134 are released by the pawls 331 springs 363 draw all of the slides leftwards until they are stopped in their blank positions by striking a resilient stop bar 364. The lever 360 is now released and the slides may be set, as required, in the previously described manner.

After the slides have been set the bail 334 is rocked clockwise to its locking position against the tension of the spring 341 by drawing outwardly on a rod 365 attached to one arm of the bail, which rod is provided with a suitable button on knob 366.

When the bail reaches its locking position the projection 338 registers with the notch in the lower edge of the lever 337 whereupon the lever is rocked counterclockwise by its spring 339 thus locking the bail against movement. As the bail is moved to locking position, the arm 343 is rocked to withdraw the projection 346 from the recess 345 thus freeing the machine for operation.

So long as one of the levers 337 is held in its raised position by the projection 338 the machine may not be started due to the contacts 297 and 298 (see also Fig. 22) which contacts are open when their corresponding levers 337 are operated. When, as set forth above, the bail 334 is restored to locking position and the lever drops over the projection 338 a projection 367 secured to the lever 337 closes the contacts 297 or 298 thus making it possible to set up the starting circuit by depression of the start key 287 (Fig. 22).

Means is provided to warn the operator if the control and locking members, above described, do not assume their proper normal position. For instance, if the bail 334 (Fig. 21) fails to assume its exact locking position, the lever 337 is held up, and under this condition the machine may not be operated because the contacts 297 are open. A warning signal, including a lamp 368 (Figs. 3 and 22), is energized when the lever 337 for either group of slides 134 is in its raised position. When the lever 337 is rocked clockwise, upon depression of the key 340, it rocks a bail 369 common to both levers 337, and closes contacts 370.

Referring to Figure 22 it can be seen that when contacts 370 are closed a magnet 371 is energized and contacts 372 closed. This closes a circuit through the filament of the lamp 368. The light produced by the lamp may be observed through a sight opening 373 (Fig. 3).

As soon as the condition is corrected and the lever 337 rocks counterclockwise (Fig. 4) to its normal position the contacts 370 open, deenergizing the magnet 371 (Fig. 22) whereupon the contacts 372 open to deenergize the lamp 368. Restoration of the lever 337 to the position in which it appears in Figure 4 also closes contacts 297 and the machine may be started by depressing the start key 287.

*Operation*

A description will now be given of the operation of the machine.

The operator places a sufficient number of cards in the stack 47 and then sets up the counter wheels to the number of cards he wishes to punch with a given set of data. Either one or both of the keys 340 is then depressed. If these keys cannot be depressed it is an indication that the main switch 30 (Fig. 22) is open. Upon closing this switch the magnets 358 become energized and rock their armatures to unlock the slides 348 thus permitting the depression of the keys 340. Depression of the keys 340 opens the contacts 297 and 298 to prevent operation of the machine until the set up is completed, and closes contacts 370 to light the signal lamp 368. Depression of the keys 340 also frees the bails 334 and the arms 343 to the action of their springs 341, which springs immediately rock the arms 343 clockwise and the bails 334 counterclockwise.

If the machine is in its home position the projections 346 enter their recesses 345 rocking the bails 334 to their unlocking positions. But if the machine is not in its home position the projections 346 strike the peripheries of their respective cams holding the bails 334 in their locking position. The operator is aware of this condition by the fact that he cannot operate the levers 332 to release the slides 134, and proceeds manually to turn the machine to home position. When the recesses 345 register with their projections 346 the arms 343 and the bails 334 complete their movement. The levers 332 may now be rocked to free the slides 134 and said slides may be adjusted.

When the required adjustment of the slides has been made the operator pulls outwardly on the rod 365, and, if the slides 134 have been properly set and the levers 332 restored to their locking positions, the bail 334 may be rocked clockwise until the notch in the lower edge of the lever 337 registers with the projection 338 whereupon the spring 339 rocks the lever 337 latching the bail 334 in its locking position. The downward movement of the lever 337 lowers the link 348 bringing the projection 349 thereon opposite its opening in the locking arm 350 of the armature 356.

The operator now presses the start key 287 (Figs. 1 and 22) which, as above set forth, energizes the starting circuit and starts the machine operating. During the operation of the machine cards are fed from the bottom of the stack 47 to the first punching position when data are punched in the field indicated at 118 (Fig. 24) and the interpretation of said data is printed on the line indicated at 169.

The card is then fed to the second punching position and, at the same time, the following card is fed from the stack to the first punching position. The punches in both positions now operate to punch the two cards simultaneously, the punches in the second position punching the first card in the field indicated at 119 (Fig. 24) and those in the first position punching the following card in the field indicated at 118. The printing mechanism in the second position operates to print on the leading card on the line indicated at 170 simultaneously with the operation of the printer in the first position to print on line 169. The first card is then fed out of the machine to the stack 80 and simultaneously the second card is fed from the first to the second position while a third card is fed from the stack 47 to the first position.

This continues until the counter reaches "0" when the machine is stopped under the control of the discs 285 (Fig. 17) and 320 (Fig. 16) in the manner set forth above. The setting of the slides 134 may now be altered and a new number run onto the counter and the operation continued.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, the combination with a card magazine, and a card receiving receptacle, of a punching station intermediate the magazine and the receptacle, means to feed cards past the punching station, a picker to feed cards from the magazine to the feed means, and means automatically to move the cards in the magazine out of operative relation with the picker to render said picker ineffective.

2. In a machine of the class described, the combination with a card magazine, and a card receiving receptacle, of a plurality of punching stations intermediate the magazine and the receptacle, means to feed cards past the punching stations, a picker to feed the cards from the magazine to the feed means, means to move the cards in the magazine out of operative relation with the picker to render said picker ineffective, and means automatically to stop the machine after the last card fed by the picker has passed the last punching station.

3. In a machine of the class described, the combination with a card magazine, and a card receiving receptacle, of a plurality of punching stations intermediate the magazine and the receptacle, a picker to feed cards out of the magazine, means to feed the cards past the punching stations, means to stop the cards at each punching station to receive the punching operation, and means to move the cards in the magazine out of operative relation with the picker to prevent feeding the cards from the magazine.

4. In a machine of the class described, the combination with a card magazine, and a card receiving receptacle, of a plurality of punching stations intermediate the magazine and the receptacle, a picker to feed the cards from the magazine, means to feed the cards past the punching stations, a counter to count the cards, and means controlled by the counter to move the cards in the magazine out of operative relation with the picker after a predetermined number of cards have been fed.

5. In a machine of the class described, the combination with a card magazine, and a punching mechanism, of means to feed the cards from the magazine to the punching mechanism, means to move the cards in the magazine out of operative relation with the feed means, means to count the cards, and means controlled by the counter to render the card moving means effective.

6. In a machine of the class described, the combination with a card magazine, of means to feed the cards from the magazine, means to count the cards, means to lift the cards above the path of the feed means, and means controlled by the counter to render the lifting means effective after a predetermined number of cards have been fed out of the magazine.

7. In a machine of the class described the combination with a card magazine, of means to feed the cards out of the magazine, means to lift the cards out of the path of the feed means, means to restrain the lifting means, a counter to count the cards, and means controlled by the counter to release the lifting means.

8. In a machine of the class described including a main operating mechanism, the combination with a card magazine, of means to feed cards out of the magazine, means to lift the cards out of the path of the feed means, means operated by the main operating mechanism once at each operation of the main operating mechanism, a step by step counter, and means controlled by the counter to restrain the lifting means.

9. In a machine of the class described including a main operating mechanism, the combination with a card magazine, means to feed cards out of the magazine, means to lift the cards in the magazine out of the path of the feed means, means to normally restrain the lifting means, said restraining means being operated to free the lifting means once at each operation of the machine, and other means to restrain the lifting means when said lifting means is freed by the first mentioned restraining means.

10. In a machine of the class described including a card magazine, the combination of means to feed the cards from said magazine, means to count the cards, and means operable under the control of the counter to effect lifting of the cards in the magazine.

11. In a machine of the class described including a card magazine, the combination of means to feed the cards from said magazine, means to count the cards, card lifting means controlled by the counting means to prevent feeding of cards, and means controlled by the counter to stop the machine at a predetremined time following the feeding of the last card from the magazine.

12. In a machine of the class described including a card magazine, the combination of means to feed cards from the magazine, a counter to count the cards, and means operable at a predetermined point on said counter to move the cards in the magazine out of operative relation with the feeding means.

13. In a machine of the class described including a card magazine, the combination of a picker to feed cards from the magazine, a card counter, means operable under control of the counter when said counter reaches zero to stop the machine, and means operable under control of the counter when said counter reaches a predetermined point other than zero to move the cards in the magazine out of operative relation with the picker.

14. In a machine of the class described, the combination with a card magazine, of a picker to feed cards from the magazine, a card counter, card lifting means controlled by the card counter to render the picker ineffective to feed cards, and means controlled by the last card fed by the picker before said picker was rendered ineffective to stop the operation of the picker.

15. In a machine of the class described, the combination with a card magazine, of a picker to feed cards from the magazine, means to lift the cards in the magazine out of operative relation with the picker, means operated as an incident to the operation of the machine to restrain the lifting means and to free said lifting means at each operation of the machine, other means to restrain the lifting means, and means to render said other restraining means ineffective to restrain the lifting means.

16. In a machine of the class described, the combination with a card magazine, of a picker to feed cards from the magazine, means to lift the cards in the magazine out of operative relation with the picker, means to normally restrain the lifting means and to free said lifter means at each operation of the machine, other means to restrain the lifting means, and means to operate the last mentioned restraining means to free the lifting means to the control of the first mentioned restraining means.

17. In a machine of the class described including a card magazine, the combination of a picker to feed cards from the magazine, a step by step counter, means controlled by the cards fed from the magazine to operate the counter to count the cards, reciprocable means to move the cards in the magazine out of operative relation with the picker, a bail to normally restrain the reciprocable means, and means under control of the counter to rock the bail to free the reciprocable means.

18. In a machine of the class described including a card magazine, the combination of a picker to feed cards from the magazine, a card counter, means operable at a predetermined point on said counter to move the cards in the magazine out of operative relation with the picker, and manually operable means to render the card moving means ineffective.

19. In a machine of the class described including a card magazine, the combination of a picker to feed cards from the magazine, means to lift the cards in the magazine out of operative relation with the picker, means to normally restrain the lifting means and to free said lifting means at operation of the machine, other means to restrain the lifting means, means to operate the last mentioned restraining means to free the lifting means to the control of the first mentioned restraining means, and manually settable means to prevent operation of the lifting means.

EUGENE A. FORD.